United States Patent [19]
Furuta

[11] Patent Number: 5,880,890
[45] Date of Patent: Mar. 9, 1999

[54] OPTICAL SYSTEM HAVING A FOCAL POINT DETECTION DEVICE

[75] Inventor: Akiko Furuta, Kamagaya, Japan

[73] Assignee: Nikon Corporation, Tokyo, Japan

[21] Appl. No.: 931,936

[22] Filed: Sep. 17, 1997

[30] Foreign Application Priority Data

Sep. 17, 1996 [JP] Japan .................................. 8-267765

[51] Int. Cl.⁶ .......................... G02B 27/14; G03B 13/22
[52] U.S. Cl. .............................................. 359/626; 396/93
[58] Field of Search .................................. 359/626, 697, 359/698, 823; 396/93, 111, 114, 120; 250/201.8

[56] References Cited

U.S. PATENT DOCUMENTS

| | | | |
|---|---|---|---|
| 4,322,615 | 3/1982 | Fukuhara | 250/204 |
| 5,206,498 | 4/1993 | Sensui | 250/201.8 |
| 5,367,153 | 11/1994 | Suda et al. | 250/201.8 |
| 5,678,097 | 10/1997 | Suda et al. | 396/113 |

FOREIGN PATENT DOCUMENTS

| | | | |
|---|---|---|---|
| 37608 | 2/1991 | Japan | G02B 7/34 |
| 172827 | 7/1991 | Japan | G03B 13/36 |
| 174129 | 7/1991 | Japan | G03B 13/36 |

*Primary Examiner*—Georgia Epps
*Assistant Examiner*—Ricky Mack
*Attorney, Agent, or Firm*—Chapman and Cutler

[57] ABSTRACT

An optical system has a focal point detection device which is suitable for telephotography and is applicable to lenses having different image screen sizes. The optical system includes a photograph section which forms an image of an object, a driving device which moves either the entire photograph section or a part thereof in an optical axis direction, a plurality of re-imaging optical systems which forms re-images of the image of the object by light beams passing through different portions of a pupil of the photograph section, a plurality of imaging devices disposed in the vicinity of image planes of the re-imaging optical systems, and a controller which controls the driving device based on electric signals from the imaging devices so that the image of the object is formed on a mechanical image plane of the photograph section. The optical system is configured so that the re-images of the image of the object are formed on the imaging devices when the image of the object is formed closer to the object than the mechanical image plane of the photograph section.

20 Claims, 11 Drawing Sheets

FIG. 6A [WIDE-ANGLE END] SPHERICAL ABERRATION

FIG. 6B [WIDE-ANGLE END] ASTIGMATISM

FIG. 6D [TELEPHOTO END] SPHERICAL ABERRATION

FIG. 6E [TELEPHOTO END] ASTIGMATISM

FIG. 6C [WIDE-ANGLE END] CHROMATIC ABERRATION OF MAGNIFICATION

FIG. 6F [TELEPHOTO END] CHROMATIC ABERRATION OF MAGNIFICATION

OPTICAL SYSTEM HAVING A FOCAL POINT DETECTION DEVICE

BACKGROUND OF THE INVENTION

1. Field of the Invention

The present invention relates to a focal point detection device used in a still camera, a video camera, a television camera or the like.

2. Description of Related Art

Figure 9A:
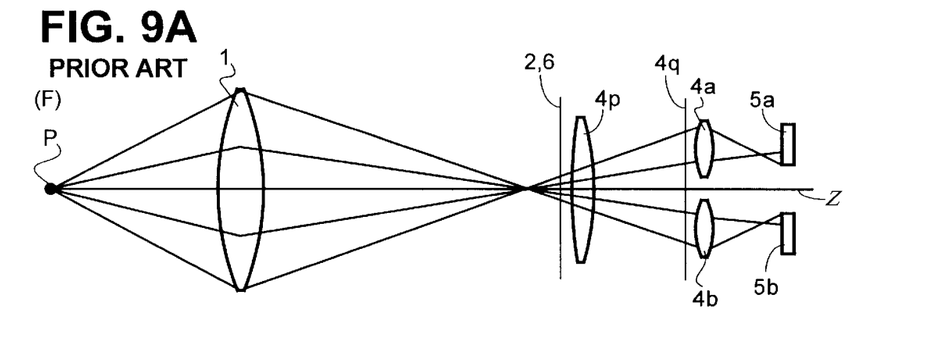
FIG. 9 is a diagram illustrating a configuration of a conventional optical system.
Figure 9B:
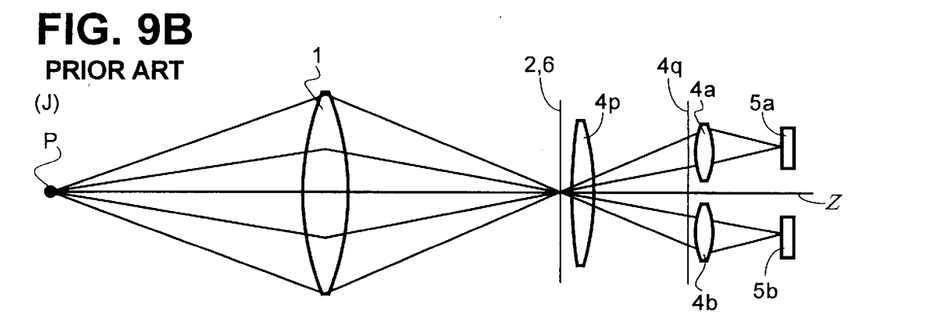
Figure 9C:
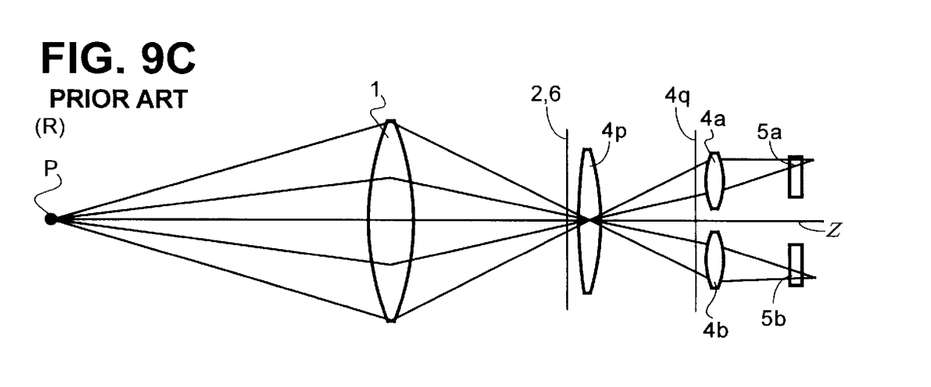

As a focal point detection device, for example, a device using a phase difference technique, as shown in FIG. 9, has been conventionally proposed. Such a device is disclosed in, for example, Japanese Laid-Open Patent Publication No. 2-24614. In FIG. 9, (J) represents an in-focus state in which an image of an object P is formed just on a mechanical image plane 2 of a photograph lens 1. Light imaged on the mechanical image plane 2 further passes through a field lens 4p and an aperture stop 4q, and thereafter passes through a pair of secondary optical systems 4a and 4b which are spaced away from an optical axis z of the photograph lens 1 by the same distance but in opposite directions. The light is then imaged again just on an array of light receiving elements 5a and 5b. In other words, the field lens 4p is arranged so that an exit pupil of the photograph lens 1 and entrance pupils of the secondary optical systems 4a and 4b are in conjugate relations. The mechanical image plane 2, therefore, serves as an object plane of a re-imaging optical system composed of the field lens 4p and the secondary optical systems 4a and 4b, while the array of light receiving elements 5a and 5b serves as an image plane thereof.

As a result, in the in-focus state, the object P is imaged just on the mechanical image plane 2. The object P is then re-imaged just as a point image with no spread approximately at the center of each of the light receiving elements 5a and 5b.

In FIG. 9, (F) represents a so-called front-defocus state in which the photograph lens 1 is sent out forward, i.e., toward the object P, from a position at which the photograph lens 1 is positioned in the in-focus state. In the front-defocus state, the image of the object P is formed at a position shifted forward from the mechanical image plane 2 by a distance $z_f$. This image, therefore, is blurred on the mechanical image plane 2. Also, on the light receiving elements 5a and 5b, the images of the object P are blurred and expand as compared to those formed in the in-focus state. A central point of the blurred images is closer to the optical axis z than that in the in-focus state.

In FIG. 9, (R) represents a so-called rear-defocus state in which the photograph lens 1 is sent out backward from the in-focus state position. In the rear-defocus state, the object P is imaged at a position shifted backward from the mechanical image plane 2 by a distance $z_r$. This image, therefore, is blurred on the mechanical image plane 2. Also, on the light receiving elements 5a and 5b, the images of the object P are blurred and expand as compared to those formed in the in-focus state. The central point of the blurred images becomes more distant from the optical axis z than that in the in-focus state.

Each defocused amount $z_f$ or $z_r$ corresponds to a distance between a position at which the image of the object P is formed and the mechanical image plane 2. The defocused amount $z_f$ or $z_r$ can be obtained based on a distance between centers of light amount distributions respectively formed on the light receiving elements 5a and 5b. The photograph lens 1 is then controlled to be moved in the optical axis direction by a driving device so that the image of the object P is formed on the mechanical image plane 2.

Recently, zoom ratios of zoom lenses have become larger. Focal lengths on telephoto sides thereof have also increased more and more. In a zoom lens, if a length ratio of an object to an image of the object in an optical axis direction is a longitudinal magnification $\alpha$ and a height ratio of the object to the image in a direction perpendicular to the optical axis is a lateral magnification $\beta$, then $\alpha=\beta^2$. Moreover, an absolute value $|\beta|$ of the lateral magnification $\beta$ becomes larger as a focal length f of a photograph lens increases. Thus, the longitudinal magnification $\alpha$ also becomes larger as the focal length f of the photograph lens increases. In other words, assuming that the object is moved in the optical axis direction by the same amount, the defocused amount of the image becomes larger as the focal length of the lens increases.

Figure 10A:
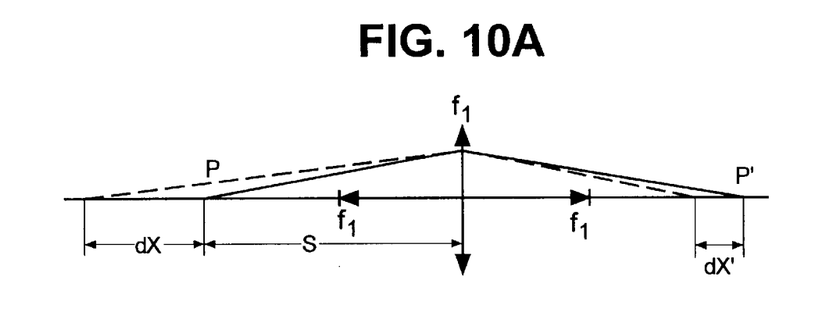
FIG. 10 is a diagram showing a focal point detectable region on front-defocus side and in which (A) shows the region in a lens having a shorter focal length while (B) shows the region in a lens having a longer focal length.
Figure 10B:
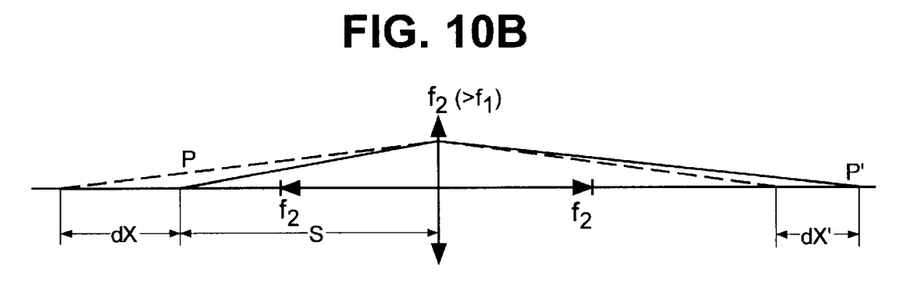

When the defocused amount of the image is assumed to be the same, however, an object-field focal point detectable region, in which the movement of the object in the optical axis direction can be detected, becomes smaller as the focal length of the lens increases. This is apparent from FIG. 10.

When the object-field focal point detectable region is small, in order to locate a focal position, it is necessary to move a part of the photograph lens 1 or the whole photograph lens 1 forward and/or backward until the photograph lens 1 reaches a position at which the focal position can be detected. When the photograph lens is moved in a focusing direction, there is no problem. However, when the photograph lens is moved in a direction opposite to the focusing direction, the in-focus state cannot be reached, irrespective of how much the lens is moved. After it is judged that the in-focus state cannot be reached, when the movement direction of the photograph lens is reversed so that movement in the focusing direction occurs, the photograph lens enters the object-field focal point detectable region and an automatic focusing operation is made practicable. However, in this case, there are various problems of, for example, difficulty of high-speed focusing, a blur of the image due to forward and/or backward movement of the lens, and shake of an image screen in a case of moving picture such as, for example, a video image or a television image.

As the focal length of the photograph lens becomes longer, the object-field focal point detectable region becomes smaller. Various drawbacks are present in the aforementioned conventional focal point detection device.

Figure 11:
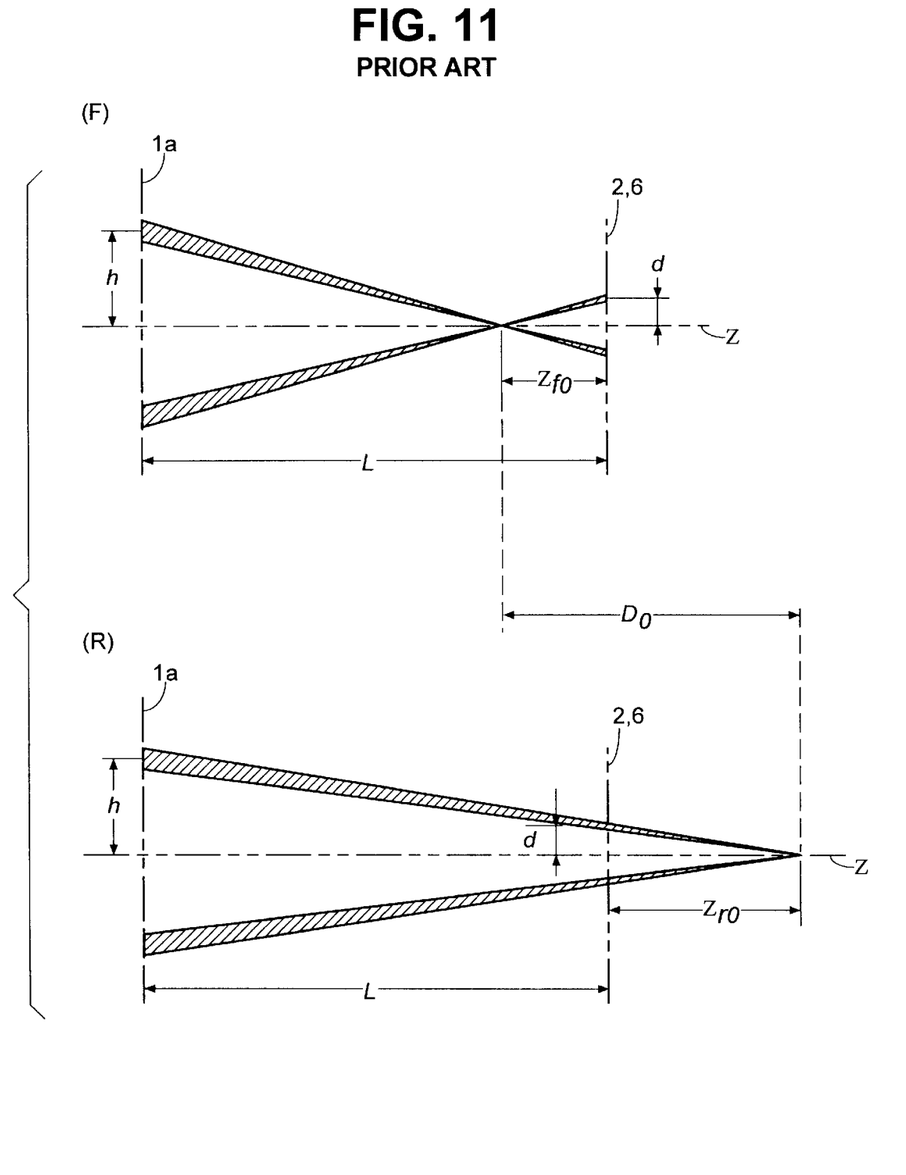
FIG. 11 is a diagram illustrating a configuration of a main portion of the conventional optical system.

In FIG. 11, (F) shows one of the front-defocus states in the aforementioned conventional focal point detection device. In this state, the defocused amount is the largest while the focal point is detectable. As is apparent from (F) of FIG. 11, $$h/(L-z_{f0})=d/z_{f0}$$

where L is a distance from the exit pupil 1a of the photograph lens to the mechanical image plane 2, $z_{f0}$ is the largest defocused amount on the front-defocus side when the focal point is detectable (the object-field focal point detectable region on the front-defocus side), h is a maximum radius of a bundle of light beams, which is used in the focal point detection device, at the exit pupil 1a of the photograph lens, and d is a maximum height of the bundle of light beams, used in the focal point detection device, from the optical axis on a conjugate plane 6 of the imaging devices with respect to a re-imaging optical system.

Therefore, the expression:

$$z_{f0}=Ld/(h+d) \tag{1}$$

is obtained.

Moreover, (R) of FIG. 11 shows one of the rear-defocus states. In this rear-defocus state, the focal point is detectable and the defocused amount is the largest. Here, $$h/(L+z_{r0})=d/z_{r0}$$

where $z_{r0}$ is the largest defocused amount on the rear-defocus side when the focal point is detectable (the size of the object-field focal point detectable region on the rear-defocus side).

Therefore, the expression $$z_{r0}=Ld/(h-d) \qquad (2)$$

is obtained.

The radius of the bundle of light beams, which enters the focal point detection device, at the exit pupil is generally set to be constant irrespective of an imaging state thereof. The radius h of the exit pupil of the photograph lens, in other words, is constant both in the state shown by (F) having the largest defocused amount on the front-defocus side and in the state shown by (R) having the largest defocused amount on the rear-defocus side. Moreover, the maximum height d of the bundle of light beams from the optical axis, which can be detected by the focal point detection device, at the position 6 which is conjugate to the photograph device with respect to the re-imaging optical system, is determined by the limit of the focal point detection device. Therefore, a value of d is also constant both in the state shown by (F) having the largest defocused amount on the front-defocus side and the state shown by (R) having the largest defocused amount on the rear-defocus side.

In the conventional focal point detection device mentioned above, the mechanical image plane 2 of the photograph lens is arranged at the conjugate position 6 of the imaging devices with respect to the re-imaging optical system. Therefore, the height d corresponds to the maximum height on the mechanical image plane 2.

From the expressions (1) and (2), $$z_{f0}<z_{r0}.$$

Thus, the size $z_{f0}$ of the object-field focal point detectable region on the front-defocus side is smaller than the size $z_{r0}$ of the object-field focal point detectable region on the rear-defocus side.

On the other hand, as described above, the focal length on the telephoto side becomes longer. This is because there is a great demand for telephotography. There are supposed to be many cases, therefore, in which the object P is positioned on the infinity side of the position in the in-focus state before the focusing operation. There are supposed to be more front-defocus states than rear-defocus states.

However, in the aforementioned conventional focal point detection device, the size $z_{r0}$ of the object-field focal point detectable region on the rear-defocus side is larger than that on the front-defocus side. Accordingly, the conventional focal point detection device does conform to actual circumstances in which the front-defocus state occurs more frequently than the rear-defocus state.

In addition, if an existing focal point detection device can be applied to lenses having different image screen sizes, then cost can be reduced. However, when a conventional focal point detection device for a large image screen size is used with a lens having a small image screen size, the size of a region in which a measurement is conducted is too large. This results in an undesirable increase in an error in selection of a photographic subject.

SUMMARY OF THE INVENTION

The present invention aims to provide an optical system having a focal point detection device which is suitable for telephotography and is applicable to various lenses having different image screen sizes.

According to one aspect of the present invention, an optical system having a focal point detection device includes a photograph section for forming an image of an object, a driving device for moving at least a part of the photograph section in an optical axis direction, a plurality of re-imaging optical systems for re-forming images of the image of the object by light beams which pass through different portions of a pupil of the photograph section, a plurality of imaging devices disposed in the vicinity of image planes of the re-imaging optical systems, respectively, and a controller for controlling the driving device based on electric signals from the imaging devices so that the image of the object is formed on a mechanical image plane of the photograph section. The optical system is configured so that the re-formed images, or "re-images", of the image of the object are formed on the plurality of imaging devices when the image of the object is formed closer to the object than the mechanical image plane of the photograph section. Moreover, in the focal point detection device, all of the re-imaging optical systems or at least some parts of the re-imaging optical systems or the imaging devices may be arranged to be movable in the optical axis direction.

DESCRIPTION OF THE PREFERRED EMBODIMENTS

Figure 1A:
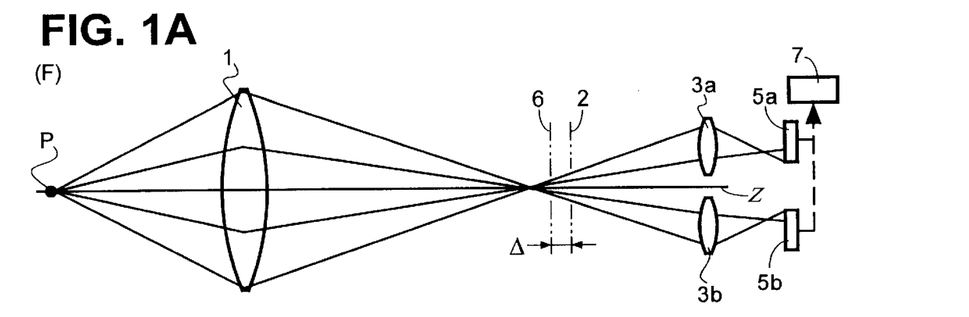
FIG. 1 is a diagram illustrating a configuration of an optical system according to a first embodiment of the present invention.
Figure 1B:
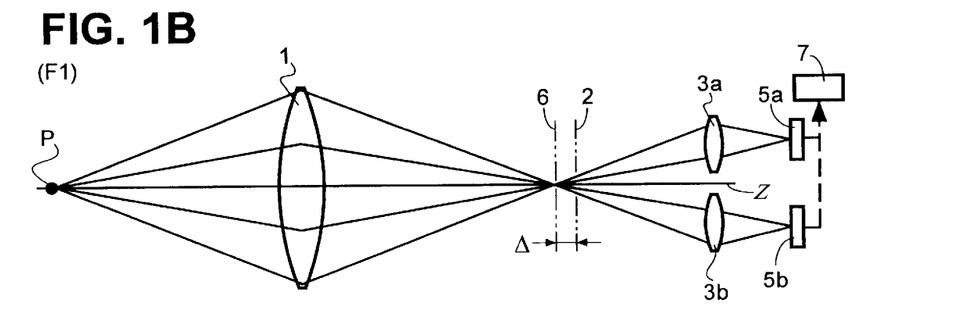
Figure 1C:
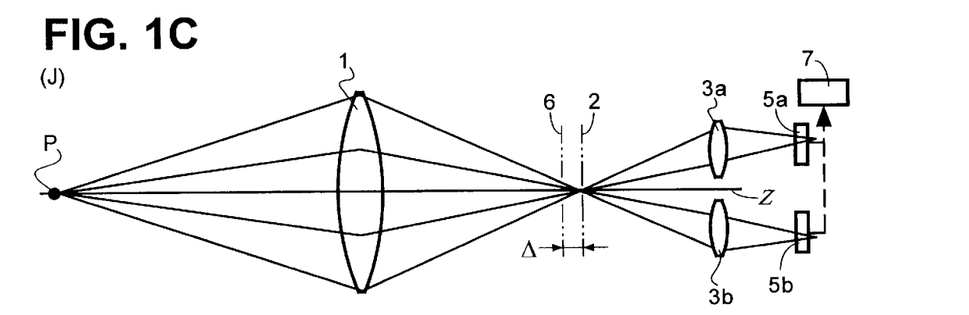
Figure 1D:
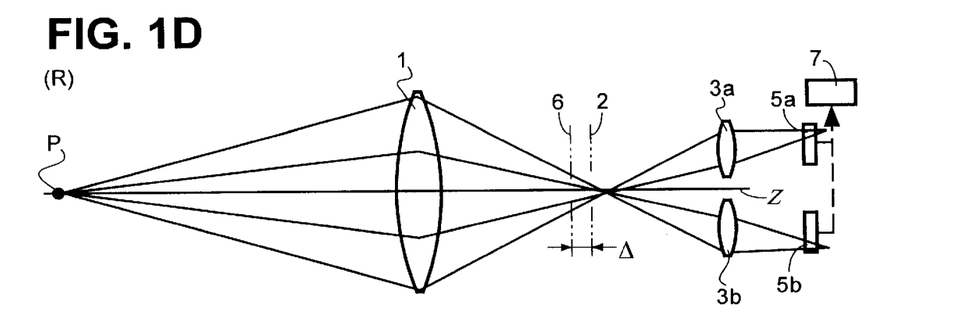
Figure 2:
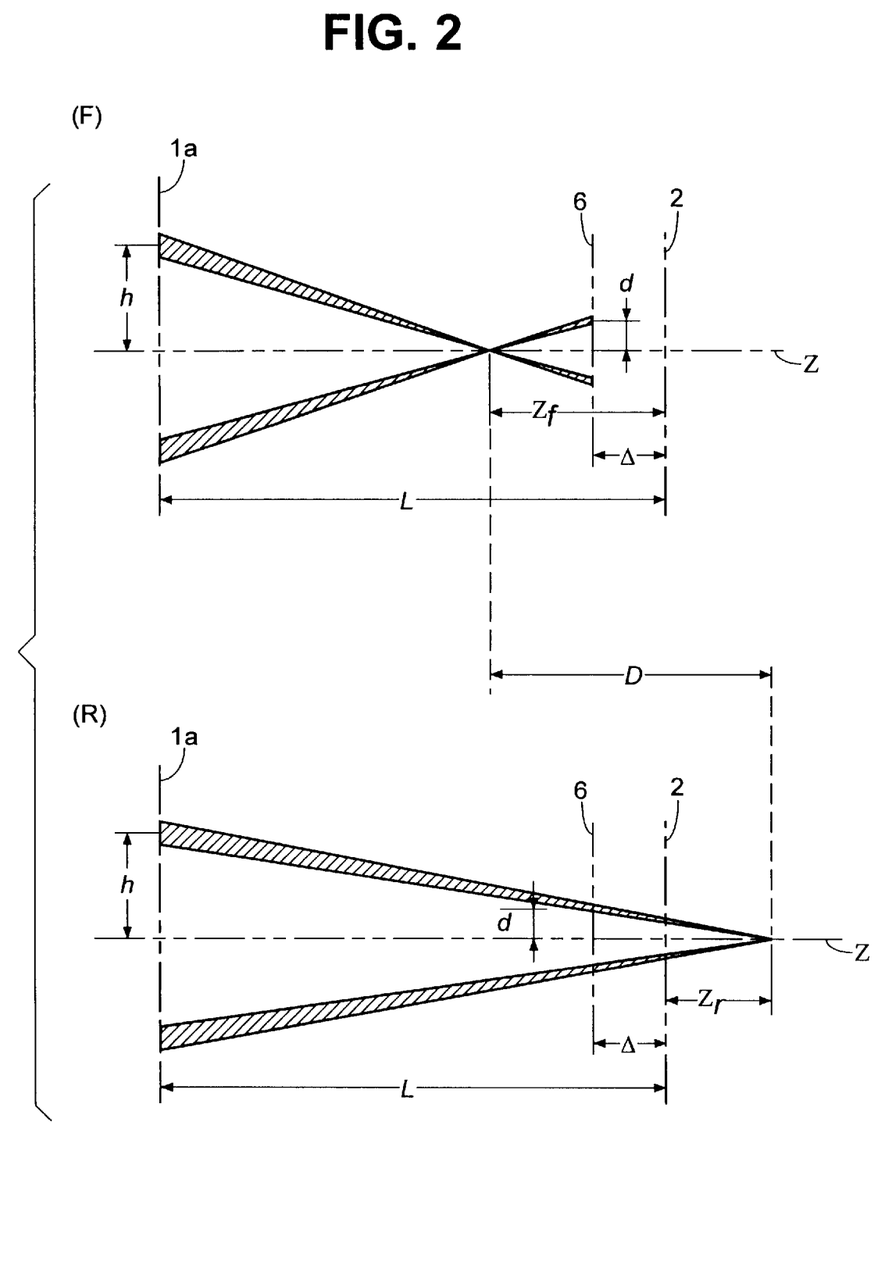
FIG. 2 is a diagram illustrating a configuration of a main portion of the optical system according to the first embodiment.

FIGS. 1 and 2 illustrate a first embodiment of the present invention. In the present embodiment, an optical system having a focal point detection device includes a photograph lens 1 which forms an image of an object P, a driving device (not shown) which moves the whole photograph lens 1 or a part thereof in a direction along an optical axis z and a pair of re-imaging optical systems 3a and 3b which form re-images of the image of the object P by light beams passing through different portions of a pupil 1a of the photograph lens 1. A pair of imaging devices 5a and 5b is disposed in the vicinity of image planes of the re-imaging optical systems 3a and 3b, respectively. A controller 7 controls the driving device based on electric signals from the imaging devices 5a and 5b so that the image of the object P is formed on a mechanical image plane 2 of the photograph lens 1. Among the components mentioned above, the re-imaging optical systems 3a and 3b, the imaging devices 5a and 5b, and the controller 7 constitute the focal point detection device. It should be noted that the use of a charge-coupled device, or CCD (a solid-state image sensor), as each of the imaging devices 5a and 5b is effective for miniaturization.

In FIG. 1, (F) shows one state of a range in which a focal position is detectable and which has the largest defocused amount on the front-defocus side. (F1) shows a state in which the re-images of the image of the object P are formed on the imaging devices 5a and 5b. In this state, the image of the object P is formed closer to the object than the mechanical image plane 2, that is, the image of the object P is front-defocused. (J) shows an in-focus state in which the image of the object P is formed on the mechanical image plane 2 and, therefore, the re-images of the image of the object P are not positioned on the imaging devices 5a and 5b. (R) shows one state of the focal position detectable region which has the largest defocused amount on the rear-defocus side.

Accordingly, in the present embodiment, a conjugate plane 6 of the imaging devices 5a and 5b with respect to the re-imaging optical systems 3a and 3b is disposed so as to be shifted from the mechanical image plane 2 toward the object.

In FIG. 2, (F) and (R) show a main portion of the optical system of the present embodiment in the states of the focal position detectable region. Here, (F) and (R) show states which have the largest defocused amount on the front-defocus side and the largest defocused amount on the rear-defocus side, respectively. As shown in FIG. 2, in the state shown in (F) having the largest defocused amount on the front-defocus side, $$h/(L-z_f)=d/(z_f-\Delta)$$

where L is a distance from the exit pupil 1a of the photograph lens to the mechanical image plane 2, $\Delta$ is a distance from the mechanical image plane 2 to the conjugate plane 6 of the imaging devices, $z_f$ is the largest defocused amount on the front-defocus side when the focal point is detectable (the size of an object-field focal point detectable region), h is a maximum radius of a bundle of light beams, which is used in the focal point detection device, at the exit pupil 1a of the photograph lens, and d is a maximum height of the bundle of light beams, which is used in the focal point detection device, on the conjugate plane 6 of the imaging devices.

Therefore, the relationship $$z_f=(Ld+\Delta h)/(h+d) \quad (3)$$

is obtained.

Similarly, in the state (R) having the largest defocused amount on the rear-defocus side, $$h/(L+z_r)=d/(z_r+\Delta)$$

where $z_r$ is the largest defocused amount on the rear-defocus side when the focal point is detectable (the size of the object-filed focal point detectable region on the rear-defocus side.

Therefore, the relationship $$z_r=(Ld-\Delta h)/(h-d) \quad (4)$$

is obtained.

A case in which $\Delta$ is equal to zero corresponds to the conventional technique. In this case, the expression (3) coincides with the expression (1) and the expression (4) coincides with the expression (2). In addition, $z_f=z_{f0}$ and $z_r=z_{r0}$. Therefore, as was previously described in connection with the conventional technique, the relationship $z_f<z_r$ is obtained.

Assuming, for example, that $z_f=z_r$, from the expressions (3) and (4), the relationship $$\Delta=(d/h)^2 L \quad (5)$$

can be obtained. This means that the size $z_f$ of the object-field focal point detectable region on the front-defocus side and the size $z_r$ of the object-field focal point detectable region on the rear-defocus side can be made the same by determining the distance $\Delta$ from the mechanical image plane 2 to the imaging devices conjugate plane 6 so as to satisfy the relationship or expression (5).

In order to increase the object-field focal point detectable region on the front-defocus side as compared to that obtained according to the conventional technique, it is necessary to have the distance $\Delta$ from the mechanical image plane 2 to the imaging devices conjugate plane 6 be larger than zero. On the other hand, the increase of the object-field focal point detectable region on the front-defocus side reduces the object-field focal point detectable region on the rear-defocus side. When the size $z_r$ of the object-field focal point detectable region on the rear-defocus side is zero, it is impossible to conduct focal point detection. Therefore, the size $z_r$ must be larger than zero. Accordingly, from the expression (4), the condition $$0<\Delta<(d/h)L \quad (6)$$

should be satisfied.

The condition or expression (6) defines a range of the shift amount $\Delta$ of the imaging device conjugate plane 6. When a value of $\Delta$ falls below the lower limit of the expression (6), the size $z_f$ of the object-field focal point detectable region on the front-defocus side becomes equal to or lower than that obtained by the conventional technique. However, when the value of $\Delta$ exceeds the upper limit of the expression (6), the total object-field focal point detectable region of the focal point detection device, which has a size $D=z_f+z_r$, does not include the mechanical image plane 2 therein. Therefore, if the object is moved after the focusing operation, then the object cannot be detected. A more preferable range of the shift amount $\Delta$ is represented by the expression:

$$0.1<\Delta<0.5(d/h)L \quad (7)$$

The size D of the total object-field focal point detectable region of the focal point detection device, which corresponds to the sum of $z_f$ and $z_r$ is obtained from the expressions (3) and (4) as follows:

$$D=(2hd/(h^2-d^2))(L-\Delta) \quad (8)$$

As is apparent from the expression (8), when a value of $\Delta$ becomes larger than zero, the size D is reduced as compared to that in the conventional technique where Δ=0. In other words, the total object-field focal point detectable region becomes narrower in the present embodiment, although the object-field focal point detectable region on the rear-defocus side is reduced and the reduced region is added to the region on the front-defocus side in order to increase the region on the front-defocus side.

As described above, in the present embodiment, the total object-field focal point detectable region D is shifted toward infinity. Therefore, when a telephoto lens or a zoom lens, which is often used for taking photographs of a distant subject, is used, a position of the subject can be directly detected.

Furthermore, in the conventional focal point detection device, control of the driving device for the photograph lens 1 is conducted while assuming that the mechanical image plane 2 of the photograph lens 1 is positioned on the imaging devices conjugate plane 6. On the other hand, in the present embodiment, the mechanical image plane 2 is positioned away from the conjugate plane 6 of the imaging devices by a distance Δ in the backward direction. Thus, simply by adding the shift distance Δ as the correction amount to the defocused amount obtained by the focal point detection device, the conventional focal point detection device can be also used.

Figure 3:
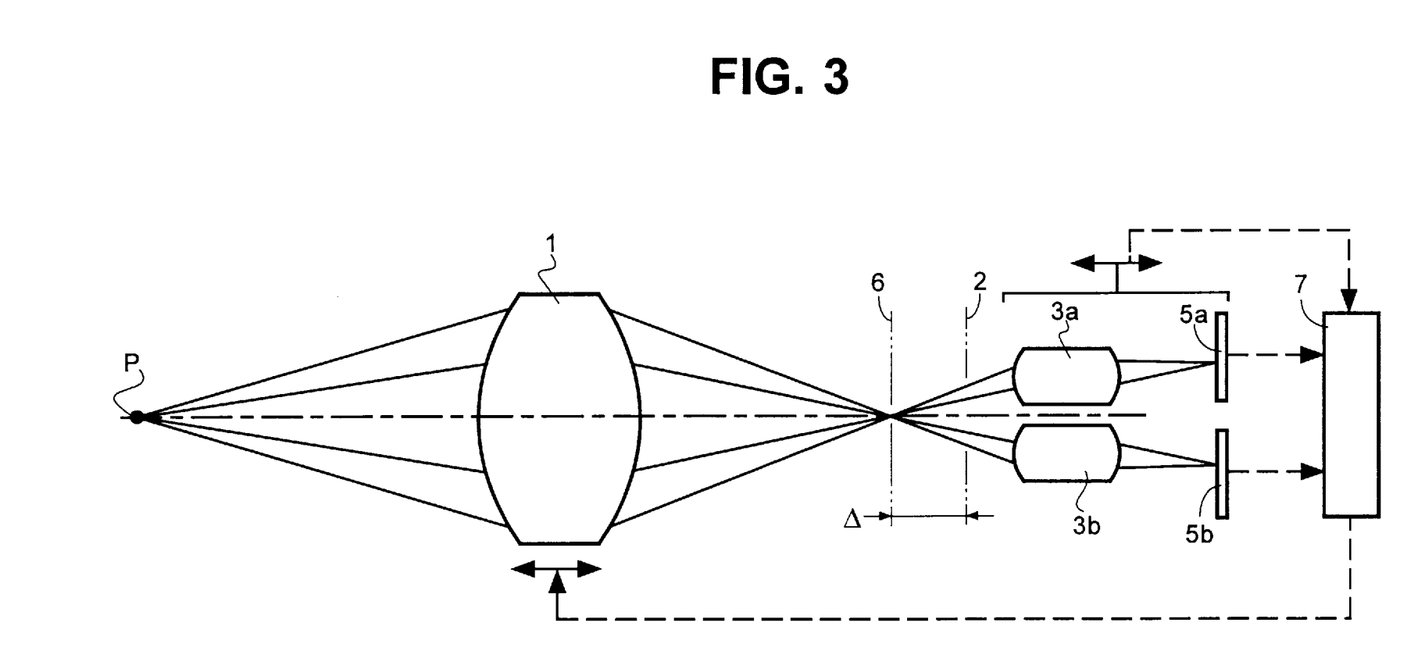
FIG. 3 is a diagram illustrating a configuration of an optical system according to a second embodiment of the present invention.

A second embodiment of the present invention is shown in FIG. 3. In the second embodiment, the re-imaging optical systems 3a and 3b and the imaging devices 5a and 5b are arranged integrally with each other and are movable in the optical axis direction parallel to the optical axis z. At this time, the moving amount of the conjugate plane is obviously equal to that of the re-imaging optical systems 3a and 3b and the imaging devices 5a and 5b. Therefore, the distance Δ from the conjugate plane 6 to the mechanical image plane 2 is also equal to the moving amount of the re-imaging optical systems 3a and 3b and the imaging devices 5a and 5b. Accordingly, the distance Δ can be obtained right away.

In the present embodiment, the focusing operation can be conducted by moving the re-imaging optical systems 3a and 3b and the imaging devices 5a and 5b forward and/or backward so as to make an image of an object P enter the total object-field focal point detectable region D. Thereafter, the photograph lens 1 is moved. Thus, it is possible to reach the in-focus state without causing shake of the image screen.

In the present invention, the re-imaging optical systems 3a and 3b and the imaging devices 5a and 5b are moved in the optical axis direction z integrally. However, only the re-imaging optical systems 3a and 3b or a part of the optical systems 3a and 3b may be moved. Alternatively, only the imaging devices 5a and 5b may be moved. The re-imaging optical systems 3a and 3b and the imaging devices 5a and 5b may otherwise be moved interdependently rather than integrally with each other. In the latter case, however, the moving amounts of the re-imaging optical systems 3a and 3b and the imaging devices 5a and 5b do not necessarily correspond to the moving amount of the imaging devices conjugate plane 6. Therefore, an additional arithmetic section for obtaining the moving amount of the imaging devices conjugate plane 6 based, for example, on only the moving amount of the re-imaging optical systems 3a and 3b is required.

Figure 4:
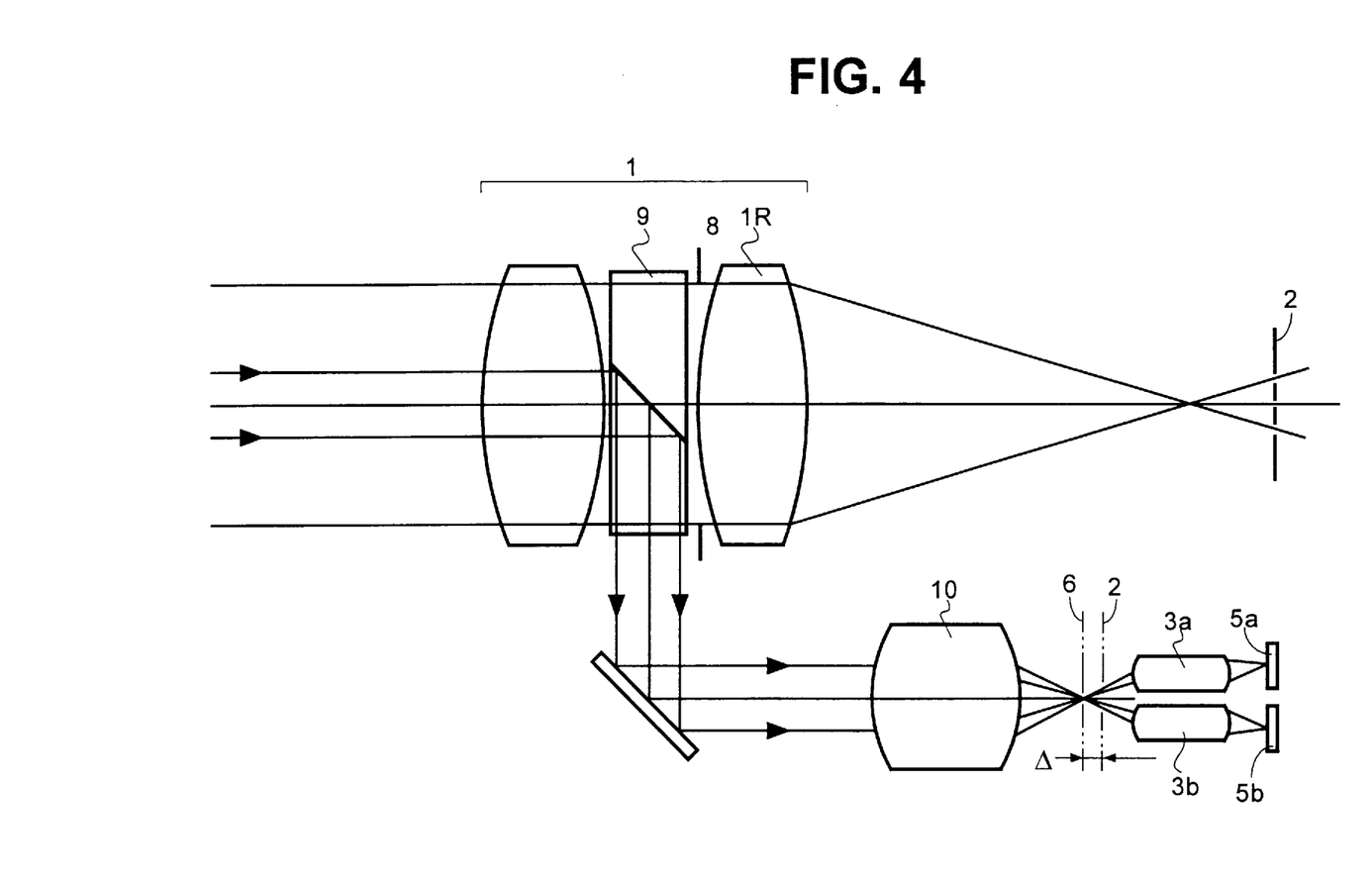
FIG. 4 is a diagram illustrating a configuration of an optical system according to a third embodiment of the present invention.

A third embodiment of the present invention is shown in FIG. 4. In the third embodiment, an aperture stop 8 is provided within the photograph lens 1. A beam splitter 9 is provided closer to the object than the aperture stop 8. Light beams which are split by the beam splitter 9 are imaged by a split imaging optical system 10 and then imaged again by the re-imaging optical systems 3a and 3b. In this way, the focal point detection device is provided in an optical path of one of the split light beams. This arrangement allows the same focal point detection device to be commonly applied to various photograph lenses 1.

At this time, it is preferable to satisfy the following expression (9):

$$0.5 < |f_{10}/f_{1R}| < 3.0 \qquad (9)$$

where $f_{10}$ is a focal length of the split imaging optical system 10, and $f_{1R}$ is a focal length of a lens group IR of the photograph lens 1, which is disposed closer to the image plane than the beam splitter 9.

The expression (9) defines a range regarding a ratio of a ranging area of the focal point detection device to a image screen size of the photograph lens 1. This expression represents a condition to be satisfied when the re-imaging optical systems of the existing focal point detection device is used in an optical system having a different image screen size. When a value of $|f_{10}/f_{1R}|$ falls below the lower limit of the expression (9), the ratio of the detectable area of the focal point detection device to the image screen size of the photograph lens 1 is too large. Consequently, a ranging error and/or mis-selection of a subject may easily arise. On the other hand, when the value of $|f_{10}/f_{1R}|$ exceeds the upper limit of the expression (9), a back focal length of the split imaging optical system 10 is too long. Miniaturization is prevented as a result. A more preferable condition is represented as follows:

$$0.7 < |f_{10} < f_{1R}| < 2.1$$

In addition, the aperture stop 8 is preferably positioned closer to the image than the beam splitter 9. If the aperture stop 8 is positioned closer to the object than the beam splitter 9, then the F-number $F_{NO}$ of the light beams directed to the focal point detection device also changes. Since the brightness required for the focal point detection device is fixed, the defocused amount is undesirably varied when light beams having an $F_{NO}$ larger than the fixed $F_{NO}$. For this reason, in order to keep the $F_{NO}$ of the light beams directed to the focal point detection device constant in any condition, the aperture stop 8 must be disposed closer to the image plane than the beam splitter 9.

Herein, exemplary values of Δ will be described. It should be noted that Δ denotes a distance from a conjugate plane 2a of the mechanical image plane 2 to the conjugate plane 6 of the imaging devices. The focal point detection device is disposed in an optical path of one of the split light beams in the third embodiment. When F-number of the light beams entering the focal point detection device from the split imaging optical system 10 is $F_{NO}$, the following relationship is satisfied:

$$F_{NO} = L/2h$$

Therefore, if $F_{NO}$=6.4, L=100 and d=3.5, then $z_{f0}$, $z_{r0}$ and $D_0$ (=$z_{f0}$+$z_{r0}$) when Δ=0 are obtained as follows:

$$\Delta=0: z_{f0}=30.9, z_{r0}=81.2 \text{ and } D_0=112.1.$$

Next, another case where $z_f = z_r$ will be considered. In this case, values of Δ, $z_f$, $z_r$ and D are obtained as follows:

$$\Delta=20.1: z_f=z_r=44.8 \text{ and } D=89.6.$$

Moreover, a maximum value of $\Delta$ and values of $z_f$, $z_r$ and D at the maximum value of $\Delta$ are obtained as follows:

$\Delta=44.8$: $z_f=61.9$, $z_r=0$ and $D=61.9$.

Figure 5:
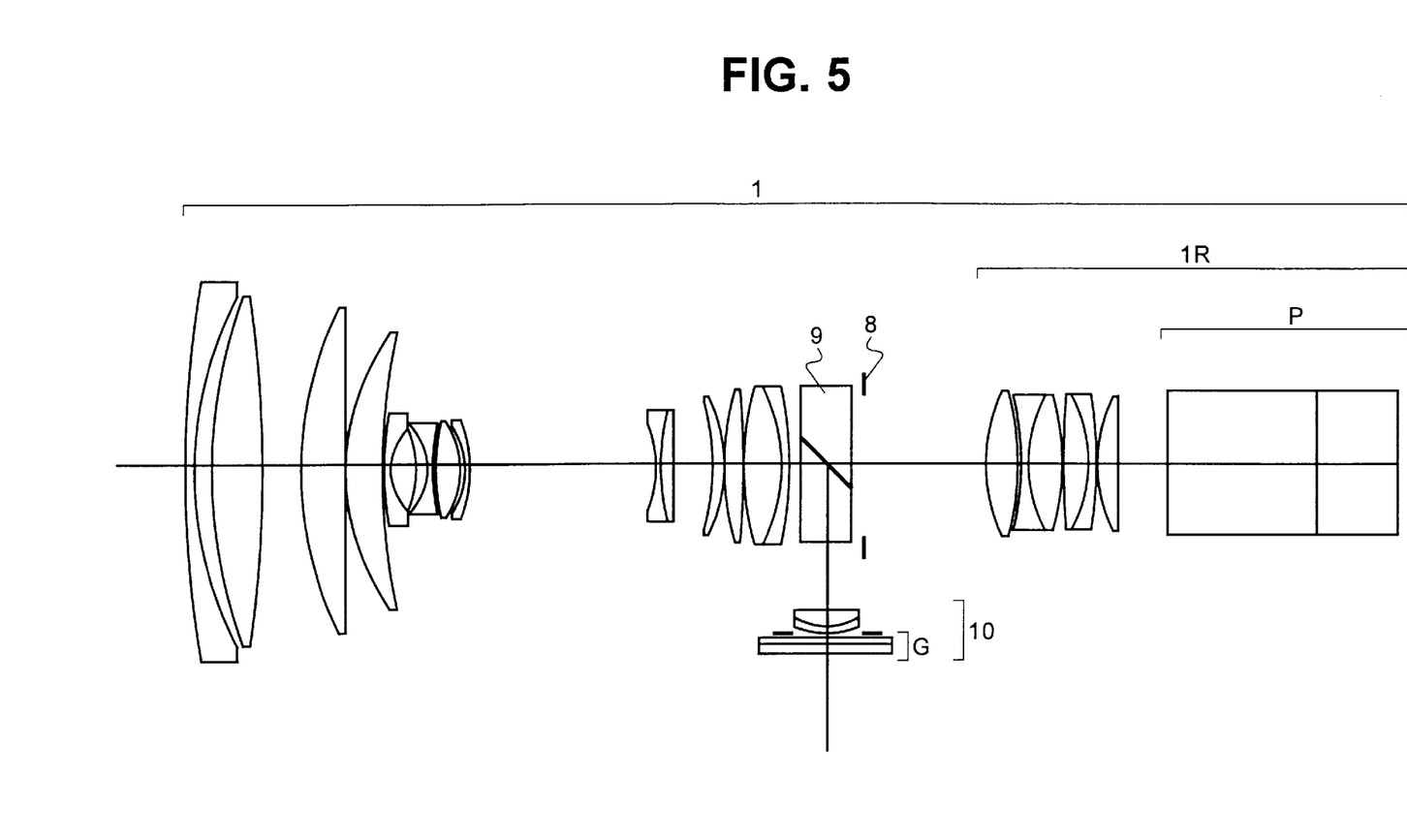
FIG. 5 is a diagram illustrating a lens arrangement according to a first numerical example of the present invention.
Figure 6A:
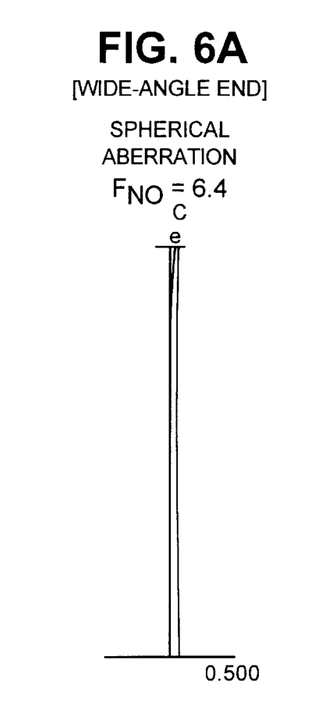
FIG. 6 is a diagram showing various aberrations of a split imaging optical system in the first numerical example.
Figure 6B:
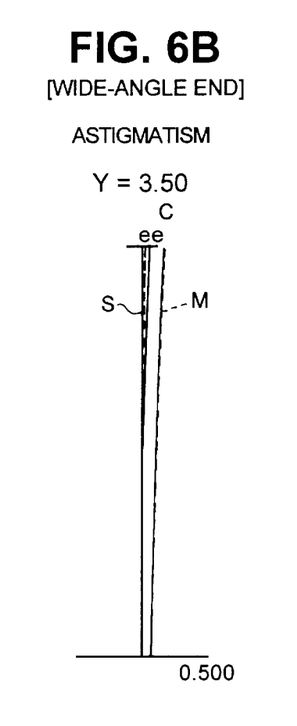
Figure 6C:
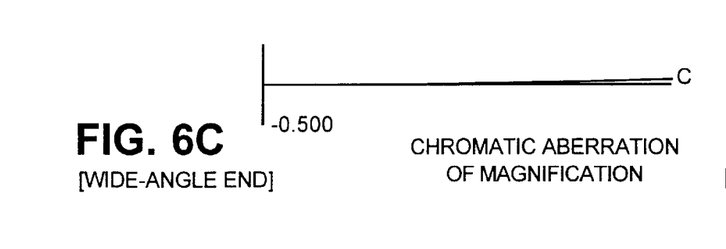
Figure 6D:
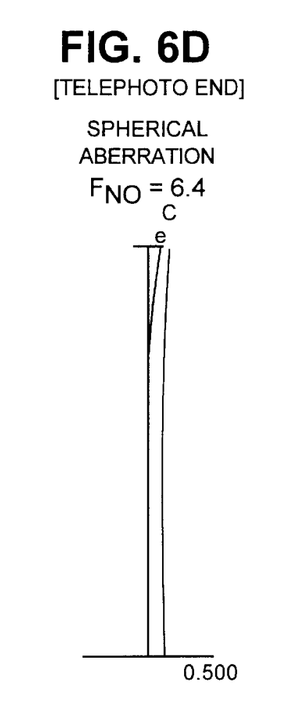
Figure 6E:
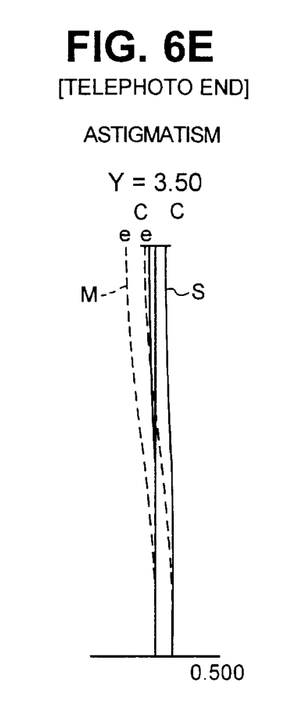
Figure 6F:
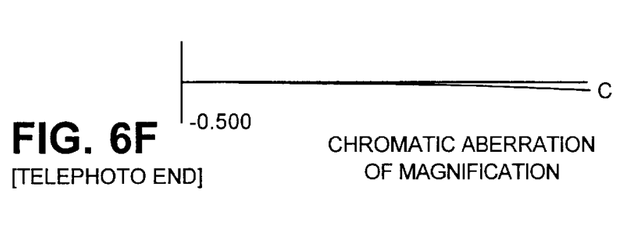
Figure 7:
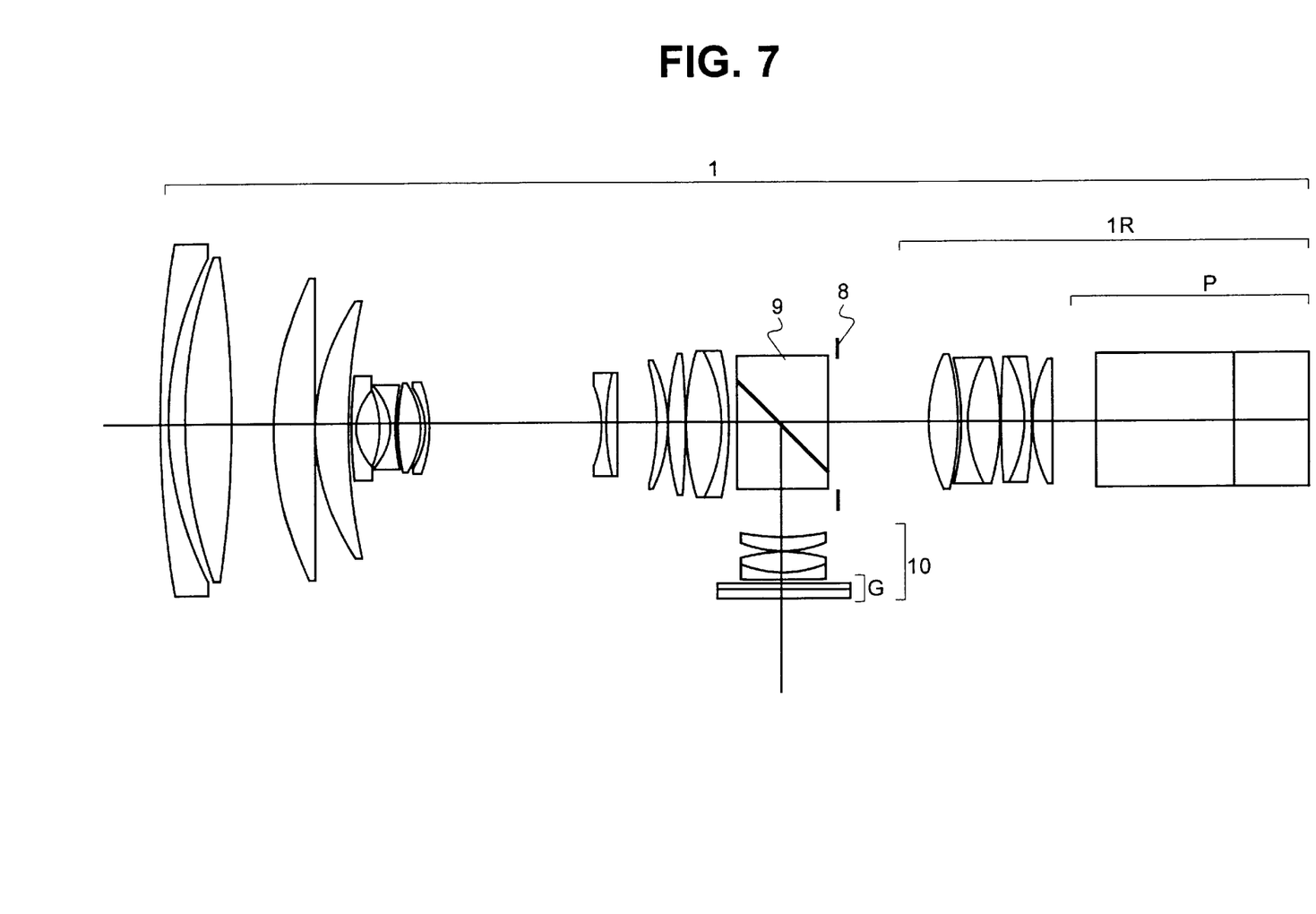
FIG. 7 is a diagram illustrating a lens arrangement according to a second numerical example of the present invention.
Figure 8A:
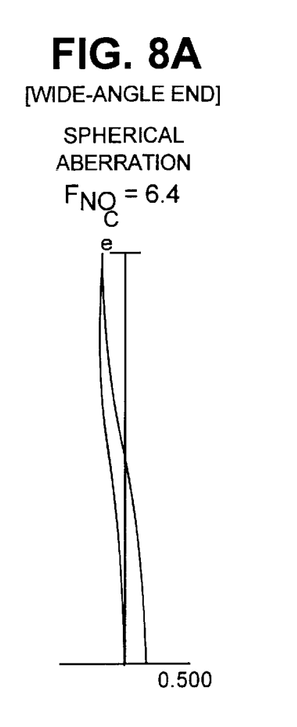
FIG. 8 is a diagram showing various aberrations of the split imaging optical system in the second numerical example.
Figure 8B:
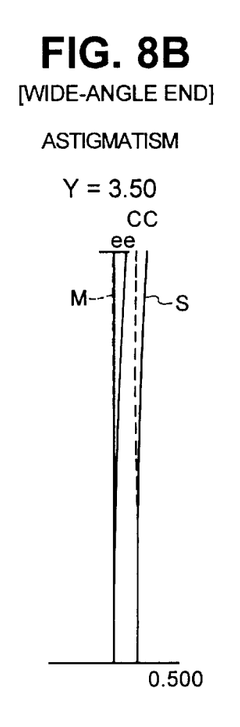
Figure 8C:
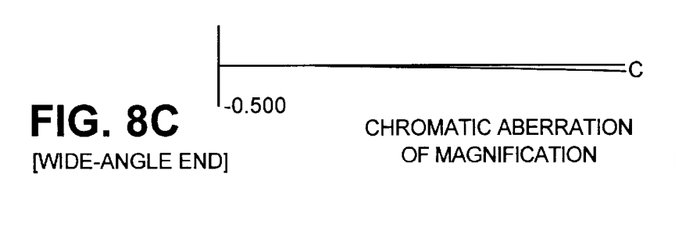
Figure 8D:
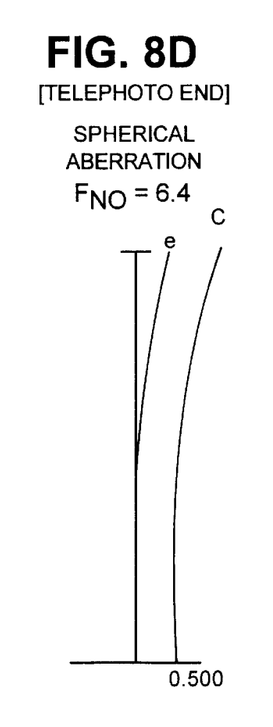
Figure 8E:
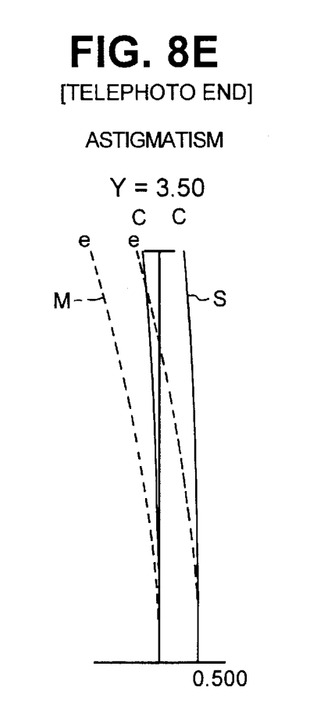
Figure 8F:
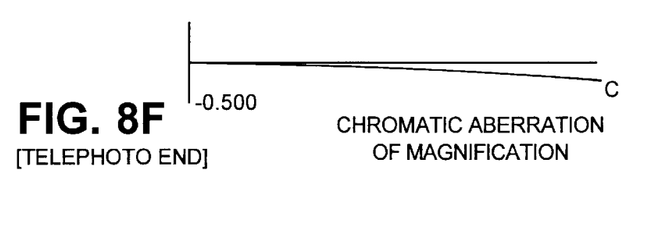

Next, numerical examples of the optical system having the focal point detection device of the present invention will be described. FIG. 5 illustrates the lens arrangement of the photograph lens 1 and the split imaging optical system 10 according to a first numerical example. FIG. 6 shows spherical aberration, astigmatism and chromatic aberration of magnification of the split imaging optical system 10 at wide-angle and telephoto ends. Similarly, FIG. 7 illustrates the lens arrangement of the photograph lens 1 and the split imaging optical system 10 according to a second numerical example. FIG. 8 shows the above-mentioned aberrations of the split imaging optical system 10 of the second numerical example. In FIGS. 5 and 7 illustrating the lens arrangement, a glass block P corresponds to a prism for three-color separation and/or a filter, while a glass block G corresponds to an IR cut filter. In FIGS. 6 and 8 showing the aberrations, Y is an image height. Furthermore, in the diagrams showing astigmatism, a meridional image plane is represented by a broken line M while a sagittal image plane is represented by a solid line S.

Data representative of the photograph lens 1 according to the first numerical example are listed in Table 1, and those representative of the split imaging optical system 10 are listed in Table 2. In the photograph lens 1 shown in Table 1, a gap between the 29th surface and the 30th surface corresponds to the beam splitter 9. On the other hand, the 29th surface in Table 1, which is the object-side surface of the beam splitter 9, is shown as the first surface in Table 2. Similarly, Table 3 lists the data representative of the photograph lens 1 according to the second numerical example, while Table 4 lists those representative of the split imaging optical system 10. In the photograph lens shown in Table 3, a gap between the 30th and 31th surfaces corresponds to the beam splitter 9. The 30th surface in Table 3, which is the object-side surface of the beam splitter 9, is shown as the first surface in Table 4.

In Tables 1 to 4, No represents the number of a lens surface, r is a radius of curvature of the lens surface, d represents a distance from the lens surface to an adjacent lens surface, $v_g$ is a partial dispersion ratio of a lens, and $n_e$ is a refractive index for e-line of the lens. The partial dispersion ratio $v_g$ is obtained using the following expression:

$v_g = (n_d - 1)/(n_g - n_d)$ where $n_d$ is a refractive index for d-line. Moreover, values for parameters included in the aforementioned expression (9) are listed in Table 5. Distances, lengths, etc., listed in the following tables are in mm unless otherwise specified.

TABLE 1

| [General data] | | |
|---|---|---|
| f = 5.5~49.5 | $F_{NO}$ = 1.7~2.2 | $f_{IR}$ = 58.2 |

| [Lens data] | | | | |
|---|---|---|---|---|
| No | r | d | $v_g$ | $n_e$ |
| 1 | 274.9191 | 1.7 | 19.14 | 1.812640 |
| 2 | 76.5114 | 3.9 | | |
| 3 | 107.2069 | 10.1 | 77.24 | 1.439850 |

TABLE 1-continued

| No | r | d | $v_g$ | $n_e$ |
|---|---|---|---|---|
| 4 | -217.8941 | ($d_1$) | | |
| 5 | 70.8775 | 9.6 | 54.70 | 1.595274 |
| 6 | -1275.3302 | 0.1 | | |
| 7 | 48.8557 | 7.3 | 54.70 | 1.595274 |
| 8 | 149.6964 | ($d_2$) | | |
| 9 | 196.6016 | 0.9 | 27.77 | 1.908641 |
| 10 | 12.5029 | 5.2 | | |
| 11 | -26.2170 | 2.5 | 17.25 | 1.869549 |
| 12 | -14.9303 | 0.9 | 42.04 | 1.751509 |
| 13 | 43.4718 | 0.1 | | 1.497300 |
| 14 | 36.1569 | 0.1 | | |
| 15 | 30.6524 | 5.6 | 23.06 | 1.622213 |
| 16 | -18.3027 | 1.1 | | |
| 17 | -14.7307 | 1.0 | 34.31 | 1.845033 |
| 18 | -25.6771 | ($d_3$) | | |
| 19 | -25.9961 | 0.9 | 37.06 | 1.808223 |
| 20 | 46.0189 | 2.4 | 17.25 | 1.869549 |
| 21 | -221.9757 | ($d_4$) | | |
| 22 | -65.5715 | 2.6 | 53.67 | 1.466186 |
| 23 | -31.0287 | 0.1 | | |
| 24 | 62.8607 | 3.8 | 53.67 | 1.466186 |
| 25 | -121.2751 | 0.1 | | |
| 26 | 56.2124 | 7.5 | 53.67 | 1.466186 |
| 27 | -35.5360 | 1.7 | 34.31 | 1.845033 |
| 28 | -82.5526 | 2.0 | | |
| 29 | ∞ | 11.0 | 35.65 | 1.747931 |
| 30 | ∞ | 2.0 | | |
| 31 | (Stop) | 25.3 | | |
| 32 | 36.5193 | 6.4 | 53.67 | 1.466186 |
| 33 | -55.8631 | 0.7 | | |
| 34 | -79.0717 | 1.5 | 31.30 | 1.875132 |
| 35 | 27.3609 | 7.2 | 53.67 | 1.466186 |
| 36 | -52.0508 | 0.1 | | |
| 37 | 206.4259 | 5.3 | 43.68 | 1.516786 |
| 38 | -27.2977 | 1.5 | 31.30 | 1.875132 |
| 39 | -83.8388 | 0.1 | | |
| 40 | 29.5193 | 4.6 | 53.67 | 1.466186 |
| 41 | -870.3220 | 10.0 | | |
| 42 | ∞ | 30.0 | 29.59 | 1.607183 |
| 43 | ∞ | 16.2 | 52.19 | 1.518723 |
| 44 | ∞ | 1.2 | | |

| [Variable distance] | | |
|---|---|---|
| | wide angle end | telephoto end |
| f | 5.5 | 49.5 |
| $d_1$ | 7.745 | 7.745 |
| $d_2$ | 0.676 | 39.631 |
| $d_3$ | 38.571 | 3.167 |
| $d_4$ | 7.952 | 4.402 |

TABLE 2

| [General data] | | | |
|---|---|---|---|
| $f_{10}$ = 51.36 | | $F_{NO}$ = 6.4 | |

| [Lens data] | | | | |
|---|---|---|---|---|
| No | r | d | $v_g$ | $n_e$ |
| 1 | ∞ | 21.7 | 35.65 | 1.747931 |
| 2 | ∞ | 13.0 | | |
| 3 | 66.4880 | 3.2 | 52.19 | 1.518723 |
| 4 | -14.2826 | 1.5 | 19.14 | 1.812674 |
| 5 | -25.3116 | 1.0 | | |
| 7 | ∞ | 1.0 | 53.80 | 1.539000 |
| 8 | ∞ | 0.0 | | |
| 9 | ∞ | 2.0 | 52.19 | 1.518723 |
| 10 | ∞ | | | |

TABLE 3

[General data]

f = 5.5~49.5        $F_{NO}$ = 1.7~2.2        $f_{IR}$ = 58.2

[Lens data]

| No | r | d | $\nu_g$ | $n_e$ |
|---|---|---|---|---|
| 1 | 274.9191 | 1.7 | 19.14 | 1.812640 |
| 2 | 76.5114 | 3.9 | | |
| 3 | 107.2069 | 10.1 | 77.24 | 1.439850 |
| 4 | −217.8941 | ($d_1$) | | |
| 5 | 70.8775 | 9.6 | 54.70 | 1.595274 |
| 6 | −1275.3302 | 0.1 | | |
| 7 | 48.8557 | 7.3 | 54.70 | 1.595274 |
| 8 | 149.6964 | ($d_2$) | | |
| 9 | 196.6016 | 0.9 | 27.77 | 1.908641 |
| 10 | 12.5029 | 5.2 | | |
| 11 | −26.2170 | 2.5 | 17.25 | 1.869549 |
| 12 | −14.9303 | 0.9 | 42.04 | 1.751509 |
| 13 | 43.4718 | 0.1 | | 1.497300 |
| 14 | 36.1569 | 0.1 | | |
| 15 | 30.6524 | 5.6 | 23.06 | 1.622213 |
| 16 | −18.3027 | 1.1 | | |
| 17 | −14.7307 | 1.0 | 34.31 | 1.845033 |
| 18 | −25.6771 | ($d_3$) | | |
| 19 | −25.9961 | 0.9 | 37.06 | 1.808223 |
| 20 | 46.0189 | 2.4 | 17.25 | 1.869549 |
| 21 | −221.9757 | ($d_4$) | | |
| 23 | −65.5715 | 2.6 | 53.67 | 1.466186 |
| 24 | −31.0287 | 0.1 | | |
| 25 | 62.8607 | 3.8 | 53.67 | 1.466186 |
| 26 | −121.2751 | 0.1 | | |
| 27 | 56.2124 | 7.5 | 53.67 | 1.466186 |
| 28 | −35.5360 | 1.7 | 34.31 | 1.845033 |
| 29 | −82.5526 | 2.0 | | |
| 30 | ∞ | 20.4 | 35.65 | 1.747931 |
| 31 | ∞ | 2.0 | | |
| 32 | (Stop) | 19.9 | | |
| 33 | 36.5193 | 6.4 | 53.67 | 1.466186 |
| 34 | −55.8631 | 0.7 | | |
| 35 | −79.0717 | 1.5 | 31.30 | 1.875132 |
| 36 | 27.3609 | 7.2 | 53.67 | 1.466186 |
| 37 | −52.0508 | 0.1 | | |
| 38 | 206.4259 | 5.3 | 43.68 | 1.516786 |
| 39 | −27.2977 | 1.5 | 31.30 | 1.875132 |
| 40 | −83.8388 | 0.1 | | |
| 41 | 29.5193 | 4.6 | 53.67 | 1.466186 |
| 42 | −870.3230 | 10.0 | | |
| 43 | ∞ | 30.0 | 29.59 | 1.607183 |
| 44 | ∞ | 16.2 | 52.19 | 1.518723 |
| 45 | ∞ | 1.2 | | |

[Variable distance]

| | wide angle end | telephoto end |
|---|---|---|
| f | 5.5 | 49.5 |
| $d_1$ | 7.745 | 7.745 |
| $d_2$ | 0.676 | 39.631 |
| $d_3$ | 8.571 | 3.167 |
| $d_4$ | 7.952 | 4.402 |

TABLE 4

[General data]

$f_{IU}$ = 107.51         $F_{NO}$ = 6.4

[Lens data]

| No | r | d | $\nu_g$ | $n_e$ |
|---|---|---|---|---|
| 1 | ∞ | 26.4 | 35.65 | 1.747931 |
| 2 | ∞ | 10.0 | | |
| 3 | −48.8039 | 3.0 | 52.19 | 1.518723 |
| 4 | −27.0314 | 0.1 | | |
| 5 | 37.7332 | 4.5 | 52.19 | 1.518723 |
| 6 | −25.2732 | 1.5 | 26.10 | 1.809452 |
| 7 | 278.7986 | 1.0 | | |
| 8 | ∞ | 1.0 | 53.80 | 1.539000 |
| 9 | ∞ | 0.0 | | |
| 10 | ∞ | 2.0 | 52.19 | 1.518723 |
| 11 | ∞ | | | |

TABLE 5

| embodiment | first | second |
|---|---|---|
| $|f_{1O}/f_{1R}|$ | 0.88 | 1.85 |

According to the present invention, an optical system having a relatively small focal point detection device, which can detect a position of a subject to be photographed without reduction of a focal position detectable region even at a telephoto end, and to which an existing focal point detection device can be applied, can be provided.

The particular embodiments described above are only examples and are not to be considered the only embodiments encompassed by the following claims.

I claim:

1. An optical system having a focal point detection device comprising:

a photograph section for forming an image of an object;

a driving device for moving at least a part of the photograph section in an optical axis direction;

a plurality of re-imaging optical systems for forming re-images of the image of the object by light beams which pass through different portions of a pupil of the photograph section;

a plurality of imaging devices disposed in the vicinity of image planes of the re-imaging optical systems, respectively; and a controller for controlling the driving device based on electric signals from the imaging devices so that the image of the object is formed on a mechanical image plane of the photograph section;

wherein the optical system is configured so that the re-images of the image of the object are formed on the imaging devices when the image of the object is formed closer to the object than the mechanical image plane of the photograph section.

2. An optical system having a focal point detection device according to claim 1, and further comprising a split imaging optical system for imaging light beams, wherein the photograph section includes an aperture stop and a beam splitter disposed closer to the object than the aperture stop, and wherein the light beams split by the beam splitter are re-imaged by the re-imaging optical systems after being imaged by said split imaging optical system.

3. An optical system having a focal point detection device according to claim 2, wherein the following condition is satisfied:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

4. An optical system having a focal point detection device comprising:

a photograph section for forming an image of an object;

a driving device for moving at least a part of the photograph section in an optical axis direction;

a plurality of re-imaging optical systems for forming re-images of the image of the object by light beams which pass through different portions of a pupil of the photograph section;

a plurality of imaging devices disposed in the vicinity of image planes of the re-imaging optical systems, respectively; and a controller for controlling the driving device based on electric signals from the imaging devices so that the image of the object is formed on a mechanical image plane of the photograph section;

wherein at least a part of the re-imaging optical systems or the imaging devices is arranged to be movable in the optical axis direction.

5. An optical system having a focal point detection device according to claim 4, wherein the re-imaging optical systems and the imaging devices are arranged to be movable integrally with each other in the optical axis direction.

6. An optical system having a focal point detection device according to claim 4, wherein the re-imaging optical systems and the imaging devices are arranged to be movable interdependently in the optical axis direction.

7. An optical system having a focal point detection device according to claim 4, and further comprising a split imaging optical system for imaging light beams, wherein the photograph section includes an aperture stop and a beam splitter disposed closer to the object than the aperture stop, and wherein the light beams split by the beam splitter are re-imaged by the re-imaging optical systems after being imaged by said split imaging optical system.

8. An optical system having a focal point detection device according to claim 7, wherein the following condition is satisfied:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

9. An optical system having a focal point detection device according to claim 5, and further comprising a split imaging optical system for imaging light beams, wherein the photograph section includes an aperture stop and a beam splitter disposed closer to the object than the aperture stop, and wherein the light beams split by the beam splitter are re-imaged by the re-imaging optical systems after being imaged by said split imaging optical system.

10. An optical system having a focal point detection device according to claim 9, wherein the following condition is satisfied:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

11. An optical system having a focal point detection device according to claim 6, and further comprising a split imaging optical system for imaging light beams, wherein the photograph section includes an aperture stop and a beam splitter disposed closer to the object than the aperture stop, and wherein the light beams split by the beam splitter are re-imaged by the re-imaging optical systems after being imaged by said split imaging optical system.

12. An optical system having a focal point detection device according to claim 11, wherein the following condition is satisfied:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

13. An image production method in an optical system comprising the steps of:

forming an image of an object;

forming re-images of the image by light beams which pass through different portions of a pupil of a photograph section;

moving at least a portion of a structure constituting re-imaging optical systems and imaging devices so as to make the image enter a total object-field focal point detectable region; and moving at least a part of the photograph section in an optical axis direction so that the image is formed on a mechanical image plane of the photograph section.

14. The method of claim 13, and further comprising the step of controlling movement of the part of the photograph section based on an output from the imaging devices.

15. The method of claim 13, wherein the re-imaging optical systems and the imaging devices are moved integrally with each other in the optical axis direction.

16. The method of claim 13, wherein the re-imaging optical systems and the imaging devices are moved interdependently in the optical axis direction.

17. The method of claim 14, wherein the re-imaging optical systems and the imaging devices are moved integrally with each other in the optical axis direction.

18. The method of claim 14, wherein the re-imaging optical systems and the imaging devices are moved interdependently in the optical axis direction.

19. The method of claim 13, and further comprising the steps of:

splitting imaging light beams with a beam splitter before forming the re-images;

imaging split light beams with a split imaging optical system; and satisfying the following condition:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

20. The method of claim 14, and further comprising the steps of:

splitting imaging light beams with a beam splitter before forming the re-images;

imaging split light beams with a split imaging optical system; and satisfying the following condition:

$$0.5 < |f_{1O}/f_{1R}| < 3.0$$

when $f_{1O}$ is a focal distance of the split imaging optical system and $f_{1R}$ is a focal distance of a lens group of the photograph section which is disposed closer to an image plane than the beam splitter.

* * * * *